Figure 1:
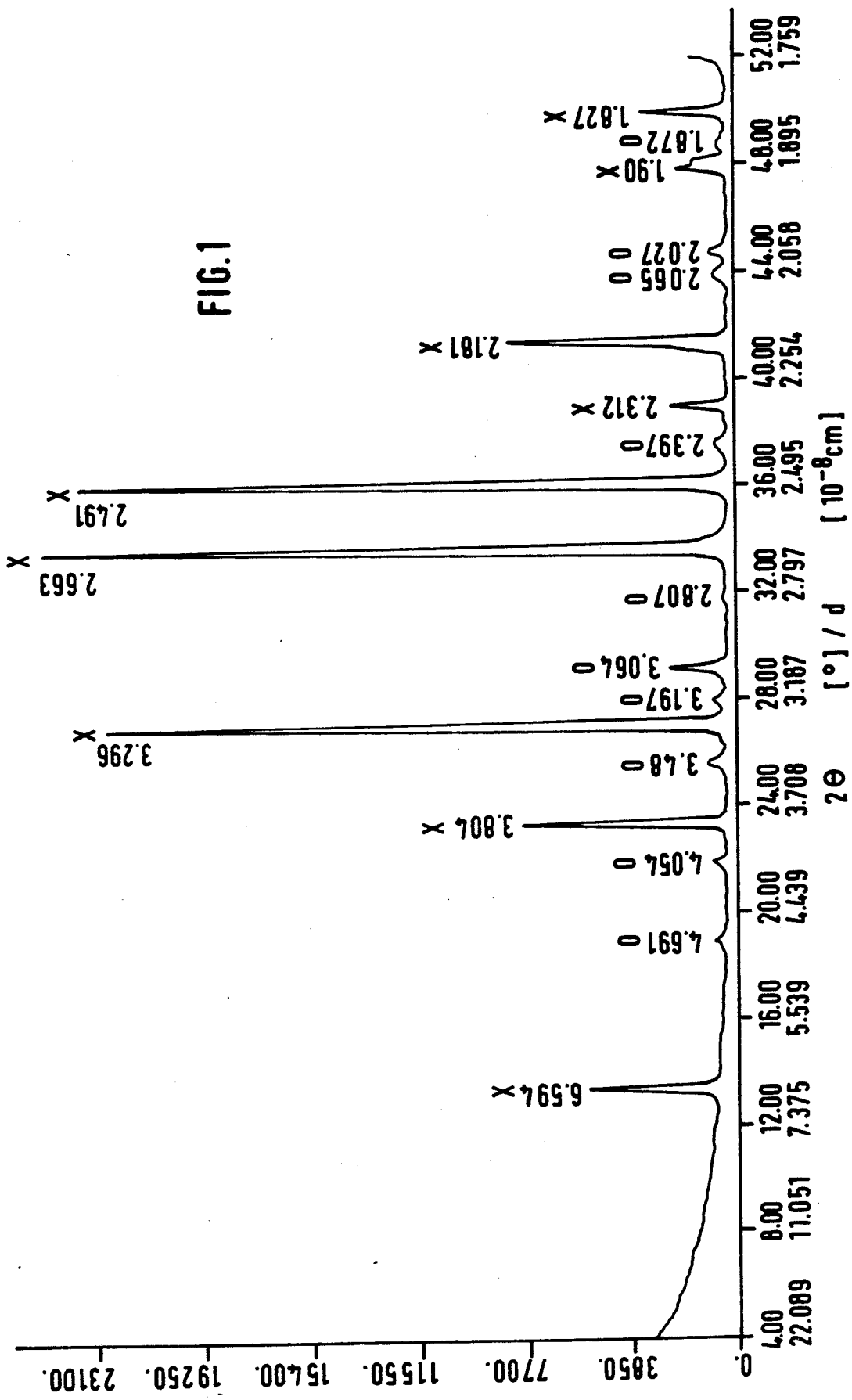

United States Patent [19]

Peuckert

[11] Patent Number: 5,128,287
[45] Date of Patent: Jul. 7, 1992

[54] SILICON NITRIDE CERAMIC HAVING DEVITRIFIED INTERGRANULAR GLASS PHASE AND A PROCESS FOR ITS PREPARATION

[75] Inventor: Marcellus Peuckert, Hofheim am Taunus, Fed. Rep. of Germany

[73] Assignee: Hoechst Aktiengesellschaft, Frankfurt am Main, Fed. Rep. of Germany

[21] Appl. No.: 441,380

[22] Filed: Nov. 27, 1989

[30] Foreign Application Priority Data

Nov. 29, 1988 [DE] Fed. Rep. of Germany ....... 3840173

[51] Int. Cl.$^5$ ............................................. C04B 35/58
[52] U.S. Cl. ......................................... 501/97; 501/98
[58] Field of Search ................................. 501/97, 98

[56] References Cited

U.S. PATENT DOCUMENTS

| | | | |
|---|---|---|---|
| 3,836,374 | 9/1974 | Richerson et al. | 501/97 |
| 4,102,698 | 7/1978 | Lange et al. | 501/98 |
| 4,179,301 | 12/1979 | Buljan | 501/97 |
| 4,327,187 | 4/1982 | Komatsu et al. | 501/97 |
| 4,365,022 | 12/1982 | Tabata et al. | 501/97 |
| 4,388,414 | 6/1983 | Mangels et al. | 501/98 |
| 4,412,009 | 10/1983 | Komatsu et al. | 501/97 |
| 4,699,890 | 10/1987 | Matsui | 501/97 |
| 4,814,301 | 3/1989 | Steinmann et al. | 301/97 |
| 4,830,800 | 5/1989 | Thomas et al. | 501/97 |
| 4,830,991 | 5/1989 | Matsui | 501/98 |

OTHER PUBLICATIONS

World Patent Index Latest Database, Nr. 83-45360k, Derwent Woche 19, 1983, Derwent Publications Ltd., London, GB; & JP-A-58 055 375.
Chemical Abstracts, Band 99, Nr. 20, 14, Nov. 1983, Seite 275, Zusammenflassung Nr. 162970n, Columbus, Ohio US; & JP-A-58 95 657 (Toshiba Corp.) Jul. 6, 1983.
L. K. L. Falk et al., *Crystallization of the Glossy Phase in an $Si_3N_4$ Material by Post-Sintering Heat Treatment*, J. Mat. Science 22(12): 4369-4376 (1987).

Primary Examiner—William R. Dixon, Jr.
Assistant Examiner—Sue Hollenbeck
Attorney, Agent, or Firm—Curtis, Morris & Safford

[57] ABSTRACT

The invention relates to a silicon nitride ceramic having a high strength both at low temperatures and at temperatures above 1000° C., and to a process for its preparation.

The silicon nitride ceramic contains, as the primary phase, β-silicon nitride and, as a crystalline secondary phase, an yttrium compound which has been caused to crystallize out from the intergranular glass phase by thermal after-treatment. Teh yttrium-containing, crystalline secondary phase has the following d-values in an X-ray diffraction pattern using Cu-Kα radiation: 4.69 ; 4.05 ; 3.48 ; 3.20 ; 3.06 ; 2.81 ; 2.40 ; 2.07 ; 2.03 ; and 1.87 , the most intense diffraction reflection having the d-value 3.06 ±0.01 . A residue of amorphous glass phase is present in the ceramic as a further phase between the crystal grains.

8 Claims, 2 Drawing Sheets

SILICON NITRIDE CERAMIC HAVING DEVITRIFIED INTERGRANULAR GLASS PHASE AND A PROCESS FOR ITS PREPARATION

The present invention relates to a silicon nitride ceramic having a high mechanical strength both at low temperatures and at temperatures above 1000° C.

Because of its high mechanical strength, ceramic material based on silicon nitride is an important material for numerous applications in technology, particularly in mechanical engineering. Silicon nitride ceramics having a high strength at room temperature are generally obtained from $\alpha$-$Si_3N_4$ powder using oxide or nitride sintering additives, such as, for example, magnesium oxide, yttrium oxide, aluminum oxide and/or aluminum nitride, by a very wide variety of processes. Usually, after the starting components have been mixed and ground, they are subjected to shaping by means of compression, slip casting or die-casting molding and the resulting mold is sintered. Sintering processes are usually carried out in a protective gas atmosphere, particularly under nitrogen at normal pressure or an elevated pressure of up to about 100 bar, or by means of hot isostatic compression at pressures of an order of magnitude of up to 2000 bar and at temperatures within the range from 1750° to 2000° C. Depending on the particular process, the content of sintering additives is about 5 to 20% by weight. Numerous combinations of a very wide range of sintering additives have already been described in the state of the art. Particular reference may be made here to the combination of silicon nitride with rare-earth oxides and aluminum oxide, aluminum nitride and titanium dioxide, which are present after sintering in the form of an amorphous, intergranular glass phase in the silicon nitride ceramic.

Depending on the composition, crystalline phases can crystallize out from this amorphous intermediate grain phase, such as, for example, when yttrium oxide is used as a sintering aid.

U.S. Pat. No. 4,102,698 names $Y_2SiO_5$ and $Y_2Si_2O_7$ in this respect.

U.S. Pat. No. 4,388,414 also discloses intermediate grain phases of the composition $Y_4Si_2O_7N_2$, $YSiO_2N$ or $Y_{10}Si_7O_{23}N_4$ by means of which it is possible to improve the stability to oxidation and, to a small extent, also the strength at high temperatures. If aluminum oxide is added, $Y_3Al_5O_{12}$ (Japanese Patent 58/55 375 A2) and $Y_4Al_2O_9$ can, in principle, also crystallize out, since they exist in the quinary phase system Si—Al—Y—O—N. Hitherto, independently of an increase in the strength at high temperatures above 1000° C. caused by a reduction in the amorphous phase component, and the associated decrease in so-called creep, no information is known regarding the increase in strength consequent on the crystallization of specific phases.

It is known from Ceram. Int. 13 (1987) page 215, that crystallization generally causes a reduction in strength values between room temperature and about 900° C.

As opposed to this, the object of the present invention was the provision of a silicon nitride ceramic having a high strength both at low temperatures and at temperatures above 1000° C., and the provision of a process for the preparation of ceramics of this type.

In accordance with the invention it has been found, surprisingly, that a novel and hitherto unknown crystalline yttrium-containing phase is formed from the intergranular glass phase in silicon nitride ceramics which are prepared by adding 3 to 6% by weight of $Y_2O_3$ and, if appropriate, up to 4% by weight of aluminum oxide as a sintering aid, by subjecting the sintered body to after-treatment by heat. This devitrification causes a significant increase in mechanical strength both at room temperature and at temperatures above 1000° C. The novel silicon nitride ceramic thus prepared is composed of at least 90% by weight of $\beta$-silicon nitride and not more than 10% by weight of the novel, yttrium-containing, crystalline phase and, if appropriate a residue of amorphous, intergranular glass phase.

The novel crystalline phase containing yttrium has been characterized by X-ray diffraction using Cu-K$\alpha$ radiation. The following d-values have been measured: 4.69 Å; 4.05 Å; 3.48 Å; 3.20 Å; 3.06 Å; 2.81 Å; 2.40 Å; 2.07 Å; 2.03 Å; and 1.87 Å. No account was taken in this of additional d-values of X-ray diffraction reflections of lower intensity, of reflections at greater diffraction angles, i.e. smaller d-values, or of reflections superimposed on the reflections of $\beta$-$Si_3N_4$. The margin of error in the d-values is about $\pm 0.01$ Å. The X-ray diffraction reflection having the highest intensity has a d-value of 3.06 Å.

FIG. I shows the X-ray diffraction pattern of a silicon nitride ceramic according to the invention together with the novel, yttrium-containing, crystalline phase (o) contained therein. Lines to $\beta$-$Si_3N_4$ are marked by (x). In both Figures the top row of figures in the abscissae relates to the 2$\theta$-value [°] and the bottom row relates to the d-value [$10^{-8}$ cm].

The crystalline phase contains yttrium, silicon, oxygen and, in some cases nitrogen. Although it has not hitherto been observed, it can definitely be assumed that the structure of the phase according to the invention can also be formed from other rare-earths than yttrium or from mixtures of several rare-earths.

It has also been found, surprisingly, that, in the case of ceramics containing up to 10% by weight, preferably 4 to 10% by weight, of yttrium oxide and, if appropriate, up to 4% by weight, preferably 2 to 3% by weight, of aluminum oxide, the crystallization of the yttrium-containing phase according to the invention in the thermal after-treatment is assisted by also adding an amount of titanium dioxide within the range from 0.5 to 5% by weight. Within the limits mentioned, the content of titanium dioxide is not to be regarded as critical. If titanium dioxide is not added when ceramics containing approx. 10% by weight of yttrium oxide are prepared and are subjected to thermal after-treatment, granite, i.e. $Y_3Al_5O_{12}$, and $Y_2Si_2O_7$ crystallize out, but this has an adverse effect on the mechanical strength.

It has also been found in accordance with the invention that the mechanical strength of the silicon nitride ceramic can be improved even further if, in addition to yttrium oxide, aluminum titanate ($Al_2TiO_5$) is added to the silicon nitride during its preparation, as an additional sintering aid. When titanium dioxide or aluminum titanate are used, silicon nitride ceramics of this type, according to the invention, are composed of at least 85% by weight of $\beta$-silicon nitride, up to 15% by weight of the novel, yttrium-containing, crystalline phase and, if appropriate, up to 5% by weight of titanium nitride (TiN) and a residue of amorphous, intergranular glass phase, it being also possible for there to be none of this residue.

FIG. II shows an X-ray diffraction pattern of a silicon nitride ceramic of this type. Lines of the new phase are marked by (o), lines of $\beta$-Si$_3$N$_4$ by (X) and lines of TiN by ($\phi$).

The preparation of the silicon nitride ceramics according to the invention is effected by processes customary in the state of the art, i.e. by vigorous mixing or grinding of the starting components in an attrition mill, annular clearance mill or a similar device. In this process $\alpha$-Si$_3$N$_4$, Y$_2$O$_3$ and, if appropriate, Al$_2$O$_3$ are ground together, and the homogeneous powder mixture thus prepared, and in the case of wet grinding subsequently dried, is converted into a porous green body by known processes of uniaxial or isostatic compression, slip casting, slip pressure die-casting, die-casting molding, band casting or other shaping processes. The green body shaped in this way is, in accordance with the invention, preferably subsequently sintered in an inert gas atmosphere at temperatures within the range from 1750° to 2000° C. The pressure of the inert gas atmosphere is preferably 0.1 to 200 MPa. The inert gas used is preferably nitrogen. Customary sintering times are within the range from 30 minutes to 5 hours.

It has also been found that a thermal after-treatment must be carried out after sintering in order to prepare the silicon nitride ceramics according to the invention. This thermal after-treatment is advantageously carried out under normal pressure in an inert gas atmosphere at 1200° to 1500° C. The inert gas employed is preferably nitrogen and/or argon. The duration of the after-treatment in accordance with the invention is 10 or more hours. During this thermal after-treatment the crystalline secondary phases crystallize out from the amorphous intergranular glass phase.

In the process for the preparation of the ceramics according to the invention 3 to 6% by weight of yttrium oxide and also, if appropriate, 0 to 4% by weight of aluminum oxide are added as sintering additives to the $\alpha$-silicon nitride powder, which can, if appropriate, be oxidized on the surface.

A further process variant consists in adding 0.5 to 5% by weight of titanium dioxide, in addition, when 4 to 10% by weight of Y$_2$O$_3$ and, if appropriate, up to 4% by weight of aluminum oxide are employed. During the sintering and the thermal after-treatment, titanium dioxide is converted into titanium nitride and thus promotes the crystallization of the yttrium-containing phase. If titanium dioxide is not added, granite and Y$_2$Si$_2$O$_7$ crystallize in the course of the after-treatment and at the high contents of the yttrium oxide and aluminum oxide mentioned. Instead of yttrium oxide, aluminum oxide and titanium dioxide, it is also possible to employ aliquot amounts of other yttrium, aluminum and titanium compounds which are converted into the oxides at an elevated temperature. The nitrates, carbonates, oxalates and acetates of the said metals should be mentioned in particular at this point.

It has been found in a preferred process variant that, instead of a mechanical mixture of Al$_2$O$_3$ powder and TiO$_2$ powder, it is possible to employ a homogeneous powder of the crystalline compound aluminum titanate (Al$_2$TiO$_5$) as a sintering additive with or without additional aluminum oxide or titanium oxide. Accordingly, aluminum titanate is preferable employed, for the preparation of the ceramics according to the invention, in amounts of up to 10% by weight, in particular amounts of up to 7% by weight. In addition, aluminum titanate can be used on its own or in combination with other sintering aids as an excellent sintering additive for silicon nitride ceramics. A silicon nitride ceramic of this type contains, as a typical composition of raw materials, about 86% by weight of $\alpha$-silicon nitride, about 10% by weight of Y oxide powder and about 4% by weight of aluminum titanate powder. Ratios by weight differing from this are definitely a part of the present invention. Even in the standard preparation without thermal after-treatment, the use of aluminum titanate as a sintering additive results in a ceramic of improved mechanical properties compared with a ceramic prepared with aluminum oxide and titanium dioxide powder.

The high values of mechanical strength which the silicon nitride ceramics according to the invention display make them particularly suitable for applications in mechanical engineering. By means of the processes described it is possible to prepare from the ceramics high-strength components, especially for applications at temperatures up to 1500° C. in internal combustion engines, as turbosupercharger rotors, piston heads, cylinder-head plates, valve faces, valve guides, rocker arms, heater plugs and precombustion chambers, and also in components for gas turbines and many other applications, even outside the field of internal combustion engines, such as, for example, in ball bearings and as nozzles and cutting ceramics.

EXAMPLES

Example 1 to 5

An $\alpha$-Si$_3$N$_4$ powder (average particle size 0.5 $\mu$m; 95% $\alpha$-/5% $\beta$-modification; 2.5% content of SiO$_2$), a Y$_2$O$_3$ powder (average particle size 1.4 $\mu$m) and an Al$_2$O$_3$ powder (average particle size 0.5 $\mu$m) in the amounts indicated in Table 1 were mixed vigorously in isopropanol and deagglomerated under wet conditions and ground in an attrition mill using ®Stemalox grinding balls composed of 85% of Al$_2$O$_3$ and 12–13% of SiO$_2$ (Hoechst CeramTec AG). After the slip had been dried in a rotary evaporator, the powder thus prepared was compressed isostatically in a silicon mold under a pressure of 300 MPa to give a green body of approximate dimensions 60×15×10 mm$^3$. This green body was heated up to 1800° C. in the course of 1.5 hours under an N$_2$ pressure of 0.1 MPa, sintered at 1800° C. isothermally for 1 hour and then cooled to room temperature in the course of about 3 hours. Test rods measuring 4.5×3.5×45 mm$^3$ were sawn from the sintered ceramic body using a diamond saw, polished and tested for bending strength in the 4-point test in a bearing measuring 20/40 mm, in air, at room temperature and at 1200° C. The compositions of the powder mixtures and the strength values obtained are collated in Table 1.

Example 6

The preparation of the ceramics and the strength testing were carried out as in Examples 1 to 5. As a difference from Examples 1 to 5, however, the following powder mixture was used: 85.9% of $\alpha$-Si$_3$N$_4$; 10.0% of Y$_2$O$_3$; 2.3% of Al$_2$O$_3$ and 1.8% of TiO$_2$ powder. X-ray diffraction analysis showed that, in addition to $\beta$-Si$_3$N$_4$, TiN was also present in the ceramics. The strength data are collated in Table 1.

Example 7

The preparation of the ceramics and the strength testing were carried out as in Examples 1 to 5. As a difference from Examples 1 to 5, however, the following powder mixture was used: 85.9% of $\alpha$-Si$_3$N$_4$; 10.9% of Y$_2$O$_3$ and 4.1% of Al$_2$TiO$_5$ powder. X-ray diffraction analysis showed that, in addition to $\beta$-$Si_3N_4$, TiN was also present in the ceramics. The strength data are collated in Table 1.

Examples 8 to 14

Figure 2:
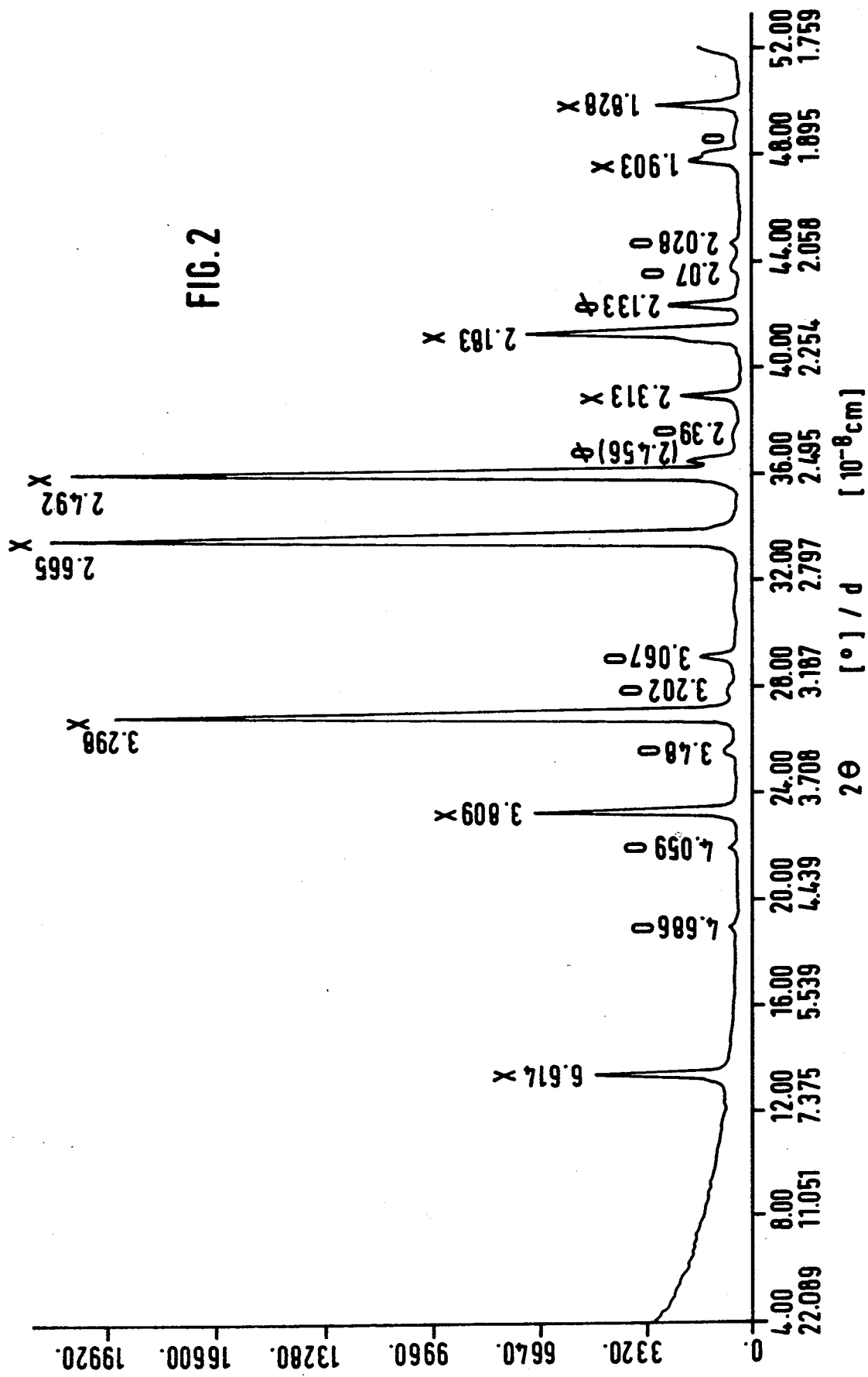

Silicon nitride ceramic bodies each of which had been prepared in accordance with one of Examples 1 to 7 were subjected to a thermal after-treatment in an $N_2$ atmosphere of 0.1 MPa. In the course of this after-treatment the body was heated up to 1350° C. in the course of 1 hour, kept at 1350° C. under isothermal conditions for 24 hours and then cooled again to room temperature in the course of 3 hours. After cooling the ceramic bodies were sawn up into test rods measuring $4.5 \times 3.5 \times 45$ mm$^3$ and their bending strength was determined in the 4-point test at 25° C. and 1200° C. The values obtained are listed in Table 2. The crystalline phases identified by means of X-ray diffraction are also listed. FIGS. 1 and 2 show X-ray diffraction patterns of the silicon nitride ceramics corresponding to Examples 10 and 13.

Examples 1-6 and also 12 are comparison examples. Comparison is made, in accordance with the invention, between Examples 8-11 and Examples 1-4, Example 13 and Example 12 and Examples 7 and 14 and Examples 6 and 13.

TABLE 1

4-Point bending strengths $\sigma_B$ of silicon nitride ceramics prepared using $Y_2O_3$, $Al_2O_3$, $TiO_2$ and/or $Al_2TiO_5$ as the sintering aid, the remainder being $Si_3N_4$.

| Example No. | Mixture (% by weight) | | | $\sigma_B$ 25° C. (MPa) | $\sigma_B$ 1200° C. (MPa) | Secondary crystalline phases |
|---|---|---|---|---|---|---|
| | $Y_2O_3$ | $Al_2O_3$ | $TiO_2$ | | | |
| 1 | 5.7 | 1.3 | — | 651 | 342 | — |
| 2 | 4.0 | 3.0 | — | 564 | 303 | — |
| 3 | 4.1 | 1.0 | — | 444 | 255 | — |
| 4 | 2.9 | 2.2 | — | 399 | 325 | — |
| 5 | 10.0 | 2.3 | — | 612 | 333 | — |
| 6 | 10.0 | 2.3 | 1.8 | 633 | — | TiN |
| 7 | 10.0 | 4.1 | ($Al_2TiO_5$) | 728 | — | TiN |

TABLE 2

| Example No. | Mixture from Example | $\sigma_B$ 25° C. (MPa) | $\sigma_B$ 1200° C. (MPa) | Secondary crystalline phases |
|---|---|---|---|---|
| 8 | 1 | 694 | 495 | new phase |
| 9 | 2 | 687 | 393 | new phase |
| 10 | 3 | 502 | 370 | new phase |
| 11 | 4 | 417 | 356 | new phase |
| 12 | 5 | 584 | 325 | $Y_3Al_5O_{12}$, $Y_2Si_2O_7$ |
| 13 | 6 | 687 | — | new phase, TiN |
| 14 | 7 | 797 | — | new phase, TiN |

I claim:

1. A process for the preparation of a silicon nitride ceramic, which comprises:
    (a) preparing a powder by vigorously mixing $\alpha$-silicon nitride and yttrium oxide or a $Y_2O_3$ precursor, and 1.13 to 7% by weight of aluminum titanate powder as starting materials, such that the content of $Y_2O_3$ in the mixture is from 4 to 10% by weight;
    (b) shaping the resulting powder mixture to form a green body;
    (c) sintering said green body under pressures of 1-100 bar in a nitrogen atmosphere and at temperatures of 1750°-2000° C.; and
    (d) subjecting the sintered body to a thermal after-treatment in an inert gas atmosphere at 1200°-1500° C. for at least 10 hours.

2. The process as claimed in claim 1, wherein the mixture contains about 4% by weight of aluminum titanate and 10% by weight of $Y_2O_3$.

3. The process as claimed in claim 1, wherein the content of $Y_2O_3$ in the mixture is 4-6% by weight.

4. The process as claimed in claim 1, wherein the mixture contains in addition, 0.5-5% by weight of $TiO_2$.

5. The process as claimed in claim 1, wherein the sintered body is subjected to a thermal after-treatment for 20 to 30 hours in an inert gas atmosphere at 1300° to 1400° C.

6. The process as claimed in claim 1, wherein the sintering of the green body is carried out for 0.5 to 5 hours at 1750° to 2000° C. in a nitrogen atmosphere of 0.1 to 200 MPa.

7. The process as claimed in claim 1, wherein $Y_2O_3$ is employed in the form of compounds which can be decomposed by heat to give the oxide.

8. The process as claimed in claim 7, wherein the Y compound employed is a nitrate, carbonate, oxalate and/or acetate.

* * * * *